US012564827B2

(12) United States Patent
Gurjar

(10) Patent No.: US 12,564,827 B2
(45) Date of Patent: Mar. 3, 2026

(54) ECO-FRIENDLY WATER RETENTION NATURAL POLYMER AND METHOD THEREOF

(71) Applicant: EF Polymer K.K., Okinawa (JP)

(72) Inventor: Narayan Lal Gurjar, Okinawa (JP)

(73) Assignee: EF POLYMER K.K., Okinawa (JP)

( * ) Notice: Subject to any disclaimer, the term of this patent is extended or adjusted under 35 U.S.C. 154(b) by 791 days.

(21) Appl. No.: 17/629,946

(22) PCT Filed: Jul. 31, 2020

(86) PCT No.: PCT/IN2020/050679
§ 371 (c)(1),
(2) Date: Jan. 25, 2022

(87) PCT Pub. No.: WO2021/019577
PCT Pub. Date: Feb. 4, 2021

(65) Prior Publication Data
US 2022/0250033 A1 Aug. 11, 2022

(30) Foreign Application Priority Data
Jul. 31, 2019 (IN) .............................. 201911030835

(51) Int. Cl.
| | |
|---|---|
| *B01J 20/24* | (2006.01) |
| *B01J 20/30* | (2006.01) |
| *B01J 20/32* | (2006.01) |

(52) U.S. Cl.
CPC ........... *B01J 20/24* (2013.01); *B01J 20/3021* (2013.01); *B01J 20/3078* (2013.01);
(Continued)

(58) Field of Classification Search
CPC .... B01J 20/24; B01J 20/3021; B01J 20/3078; B01J 20/3282; B01J 2220/4825;
(Continued)

(56) References Cited

U.S. PATENT DOCUMENTS 9,834,486 B2 * 12/2017 Lopez Villanueva . C09K 17/32

FOREIGN PATENT DOCUMENTS

| CN | 102585255 A | 7/2012 |
|---|---|---|
| EP | 3366671 A1 | 8/2018 |

(Continued)

OTHER PUBLICATIONS

Devi et al. Advances in Colloid and Interface Science 2017, 239, 136-145 (Year: 2017).*
(Continued)

*Primary Examiner* — Sally A Merkling
*Assistant Examiner* — Jordan W Taylor
(74) *Attorney, Agent, or Firm* — Greenblum & Bernstein, P.L.C.

(57) ABSTRACT

The present invention provides for a water retention polymer capable of retaining water for long durations and in huge amounts and the method of preparing the same. The polymer is capable of releasing the retained water slowly and as per the requirements of the crop and soil. Thus, the water retention polymer minimizes the water requirement during irrigation and other purposes. Further, the said polymer is eco-friendly, pollution free and completely biodegradable. The polymer can be used to grow plants on barren lands and marble slurry. The use of this polymer also minimizes the requirement of fertilizer for the crops. Further, the said water retention polymer is low-priced and hence affordable by farmers. The reduction in water requirement and fertilizer due to the use of this water retention polymer reduces 60% overall production cost for the farmers and hence results in more income generation from agriculture.

8 Claims, 2 Drawing Sheets

(52) U.S. Cl.
   CPC .... *B01J 20/3282* (2013.01); *B01J 2220/4825*
   (2013.01); *B01J 2220/68* (2013.01)

(58) Field of Classification Search
   CPC ........ B01J 2220/68; C05C 9/00; C05F 5/002;
   C05F 5/00; C05F 11/00; C05G 3/80;
   C09K 17/32; Y02A 40/20; Y02P 20/145
   See application file for complete search history.

(56) References Cited

FOREIGN PATENT DOCUMENTS

| | | | |
|---|---|---|---|
| FR | 2990943 A1 | | 11/2013 |
| JP | 2003159528 A | * | 6/2003 |
| JP | 2007-517847 A | | 7/2007 |
| JP | 2010-538416 A | | 12/2010 |
| WO | WO1991003940 A1 | * | 4/1991 |
| WO | WO 2005/067991 A1 | | 7/2005 |
| WO | WO 2009/027993 A1 | | 3/2009 |
| WO | WO-2015039983 A1 | * | 3/2015 ............. A01N 25/02 |
| WO | WO-2018194451 A1 | * | 10/2018 ....... A61F 13/00012 |

OTHER PUBLICATIONS

Kawanaka et al. JP2003159528A English Machine Translation (Year: 2003).*
Sanchez et al. Lebensm.-Wtss. u.-Technol. 1995, 28, 380-385 (Year: 1995).*
Xiao et al. Frontiers in Plant Science, 2013, 4, 67, 1-7 (Year: 2013).*
Office Action for JP App. No. 2022-506022, dated Sep. 17, 2024.
ISR for PCT/IN2020/050679, dated Nov. 10, 2020.
Written Opinion for PCT/IN2020/050679, dated Nov. 10, 2020 (w/ translation).
Leroy et al., "Effect of Vegetable, Fruit and Garden (VFG) Waste Compost on Soil Physical Properties", Compost Science & Utilization, 16(1):43-51 (2008).

* cited by examiner

ECO-FRIENDLY WATER RETENTION NATURAL POLYMER AND METHOD THEREOF

FIELD OF THE INVENTION

The present invention relates to a polymer and in particularly relates to an eco-friendly water retention polymer. The present invention further relates to a method of preparing eco-friendly water retention polymer.

BACKGROUND OF THE INVENTION

Every country's economy depends on agriculture to a certain extent. Agriculture sector needs huge amount of water for irrigation and scarcity of water to the plants and crops results in reduction in cultivation and as a result 30-40% productive lands are left uncultivated.

Super Absorbent Polymers, also known as SAPs, hydrogel, absorbent polymers, absorbent gels, super soakers, super slurpers, water gel, are macromolecular synthetic water absorbing polymer materials. They have a water uptake potential as high as 100,000% of its own weight in a short period of time by osmosis and form granules in soil to enhance soil properties. SAPs are generally white sugar-like hygroscopic materials that swell in water to form a clear gel made of separate individual particles and can retain moisture even under pressure without risk of conflagration or rupturing/blasting.

Super Absorbent Polymers used in agriculture are mostly prepared from acrylic acids and a cross-linking agent like potassium by solution or suspension polymerization. The polymer so formed is called a polyacrylate whose swelling capacity and gel modulus depends greatly on the quantity and type of cross-linker used. Polyacrylates are non-toxic, non-irritating and non-corrosive in nature and tested to be biodegradable with a degradation rate of 10%-15% per year. They demonstrate high water absorbance potential and can freely release 95% of the same under suction pressure by plant roots.

All the present water retention super absorbent polymers are created by using chemicals, so they have adverse effects on the crops, soil, soil's moisture capacity, soil fertilizer capacity, and on farmers. The existing polymers pollute soil and air and are not fully biodegradable or take too long time to degrade completely. The examples of superabsorbent polymers available are Sodium Polyacrylate, Polyacrylamide Copolymer, Ethylene-Maleic Anhydride Copolymer, Polyvinyl Alcohol Copolymers etc. These all the SAPs are chemically made and not perfectly suitable for crop and soil health.

Thus, there is a long felt need for a super absorbent polymer and method thereof that is eco-friendly, completely biodegradable, has good water retention capacity and sustainability.

OBJECTS OF THE INVENTION

It is an object of the present invention, to provide a water retention polymer capable of retaining water for long durations.

It is another object of the present invention, to provide a water retention polymer that minimizes the water requirement in the irrigation process.

It is yet another object of the present invention, to provide a water retention polymer that is eco-friendly, pollution free and completely biodegradable.

It is yet another object of the present invention, to provide a water retention polymer that can reduce the fertilizer requirement for the crops.

It is yet another object of the present invention, to provide a water retention polymer that can be used to grow plants on barren lands and marble slurry.

It is yet another object of the present invention, to provide a water retention polymer that is low priced.

It is yet another object of the present invention, to provide a method for preparing a water retention polymer that is eco-friendly and easy to perform.

SUMMARY OF THE INVENTION

The invention provides for a water retention polymer capable of retaining water for long durations and in huge amounts. The polymer is capable of releasing the retained water slowly and as per the requirements of the crop and soil. Thus, the water retention polymer minimizes the water requirement during irrigation and other purposes. Further, the said polymer is eco-friendly, pollution free and completely biodegradable. The invention also provides for a method for preparing water retention polymer that is easy to perform and eco-friendly.

The present water retention polymer can be used to grow plants on barren lands and marble slurry. The use of this polymer also minimizes the requirement of fertilizer for the crops. Further, the said water retention polymer is low-priced and hence affordable by farmers. The reduction in water requirement and fertilizer due to the use of this water retention polymer reduces 60% overall production cost for the farmers and hence results in more income generation from agriculture.

BRIEF DESCRIPTION OF THE DRAWINGS

For a better understanding of the embodiments of the methods described herein, and to show more clearly how they may be carried into effect, references will now be made, by way of example, to the accompanying drawings, wherein like references numerals represent like elements/components throughout and wherein.

DETAILED DESCRIPTION OF THE INVENTION

Figure 1:
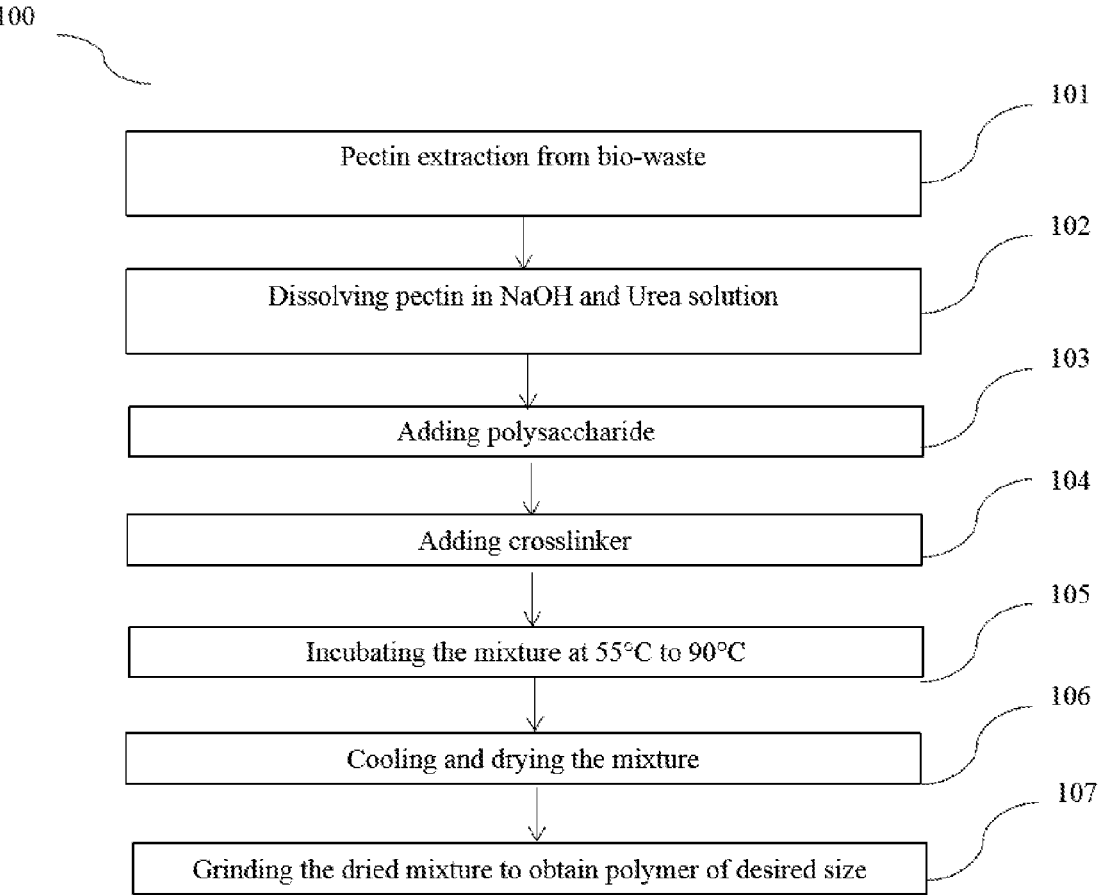
FIG. 1. Illustrates different steps of the method of preparing eco-friendly water retention natural polymer, according to an embodiment of the present invention.
Figure 2:
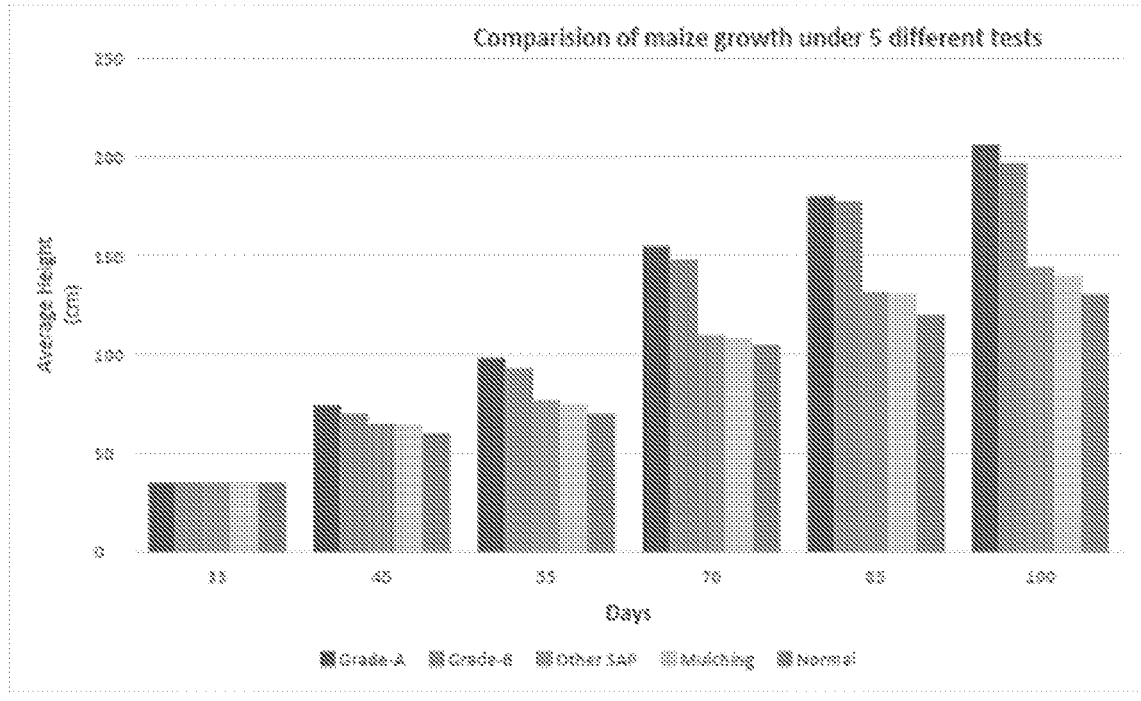
FIG. 2. illustrates the bar graph showing the comparison of maize plant growth under different test conditions, according to an embodiment of the present invention.

The embodiments of the invention will now be described herein, with reference to the accompanying examples and drawings. It will be understood by those skilled in the art that the foregoing general description and the following detailed description are exemplary and explanatory of the invention and are not intended to be restrictive thereof.

The present invention provides a water retention polymer capable of retaining water for long durations and in huge amounts. The water retention polymer has good biocompatibility, biodegradability, mechanical strength and is capable of retaining water for long durations and in huge amounts Further, the present invention provides a method for preparing water retention polymer that is cost effective, easy to perform and environment friendly.

According to an embodiment of the present invention, the water retention polymer includes a bio-waste material, a crosslinker and a polysaccharide.

Further, the bio-waste includes either or a combination of, but not limited to, fruit-waste, vegetable waste, fig barks and oil cake residue. Furthermore, the said fruit waste includes either or a combination of, but not limited to, citrus fruits peels, lemon peels, banana peels and jackfruit peels. The polysaccharides used to prepare water retention polymer and crosslinked with pectin are natural polysaccharides includes either or a combination of, but not limited to, linseed gum, cellulose, cellulose derivatives, xanthan gum, gum arabic, guar gum, tragacanth gum, acacia gum, alginic acid and hyaluronic acid. The said crosslinkers used for crosslinking pectin and polysaccharides are, but not limited to, sulfosuccinic acid. The sulfosuccinic acid is highly efficient cross linker, is non-carcinogenic, non-toxic and readily biodegradable making it environment friendly.

According to an embodiment of the present invention, the polymer is eco-friendly, pollution free and completely degradable as it is made up of all organic ingredients which are easily degradable individually and in combination as a polymer. These ingredients do not harm, leave residues or pollute the soil or air upon degradation. Upon degradation the water retention polymer provides some nutrients; micro and macronutrients to the soil and plants and acts as organic fertilizer lessening the requirement of other fertilizers by 40-60% for the growth of crop plants.

The water retention polymer minimizes the water requirement by 60-80% and hence is very useful for saving water. Such saved water can be further used for other various purposes and for irrigating the land left un-cultivated due to scarcity of water.

The water retention polymer is effective even on barren lands and on marble slurry and hence can be a solution for using such land pieces that have been left barren or where marble slurry has been dumped upon making it infertile.

Further, the reduction in water requirement of 40-80% in turn lessens the production costs for farmers. This low production cost in turn increases the income generated by agriculture sector.

Furthermore, the said water retention polymer is capable of holding water for 15-21 days with water absorbing capacity of 60-80%. The eco-friendly polymer increases the plant growth by 100-300% by providing nutrients while degrading and the said polymer is reusable up to 6 months.

According to another embodiment of the present invention, the method 100 begins at step 101, wherein pectin is extracted from the fruit waste. At step 102, the pectin powder obtained at step 101 is dissolved in 6% NaOH and 12% urea mass concentration solution and stirred for 10-15 minutes. At step 103, linseed gum powder is added to the mixture of step 102 in a ratio of 1:3 to 3:1 with constant stirring for 30 minutes. At step 104, crosslinker sulfosuccinic acid 1-10% of the total weight of polysaccharides polymer is added and incubated at 55° C. to 90° C. for 6 hours. At step 105, the reaction mixture is cooled and dried at 60° C.-80° C. for 24 hours. At step 106, the dried mixture obtained at step 105 is ground to powdered particles to obtain the water retention polymer.

Furthermore, in the preparation method of water retention polymer the aqueous solution of NaOH is 3%-8% and of urea solution is 3%-10%. The pectin powder is dissolved in NaOH and urea solution for 10-45 minutes with constant stirring at 100 rpm-500 rpm. The powdered particles of water retention polymer are of the mesh size of 60-150.

Further, the bio-waste in the said method includes either or a combination of, but not limited to, fruit-waste, vegetable waste, fig barks and oil cake residue. Furthermore, the said fruit waste includes either or a combination of, but not limited to, citrus fruits peels, lemon peels, banana peels and jackfruit peels. The polysaccharides used to prepare water retention polymer and crosslinked with pectin are natural polysaccharides includes either or a combination of, but not limited to, linseed gum, cellulose, cellulose derivatives, xanthan gum, gum arabic, guar gum, tragacanth gum, acacia gum, alginic acid and hyaluronic acid. The said crosslinkers used for crosslinking pectin and polysaccharides are, but not limited to, sulfosuccinic acid. The sulfosuccinic acid is highly efficient cross linker, is non-carcinogenic, non-toxic and readily biodegradable making it environment friendly.

The use of fruit waste to prepare water retention polymer basically solves two problems. One where fruit waste is taken care of and secondly generation of a natural, environment friendly, cost effective, sustainable and highly efficient water retention polymer that is helpful for growth of crops and to farmers.

According to an embodiment of the present invention, the pectin is extracted from the fruit peels collected from various generation sites such as juice shops, food processing sites etc. the collected waste is then cleaned and any extraneous material such as leaves, sticks etc is removed. The peels are washed with tap water followed by washing with double distilled water to remove any physical impurity on the surface. The waste is then dried at a temperature below 60° C. for 24-48 hours until constant weight is obtained. The dried material is then ground and sieved using sieve of mesh size 60-80. The powder thus obtained is mixed with water in a ratio of 1:50 and pH is maintained at 1-4 using lemon juice. The mixture is heated at 55° C. for 3 hours and then cooled for further processing. The soluble pectin is then separated from insoluble pectin from the mixture using cheesecloth. The soluble pectin is then precipitated using equal ratio of ethanol to soluble pectin. The ethanol is added while constantly stirring the mixture. The mixture with ethanol is then left for 30 minutes to allow the pectin to float on the surface. The mixture is then centrifuged to remove water and ethanol. The pectin thus obtained is dried and stored in powdered form for further use.

The pectin used in the preparation of water retention polymer preferably contains galacturonic acid content of above 75%, methoxy content of 9-15%, degree of esterification below 50%, more preferably 20%-25%.

EXAMPLES

In an embodiment of the present invention, water retention polymer was tested for its water retaining ability. The experiment was performed at 21° C. and humidity was maintained at 60% using a humidifier. For the experiment 5 g of starch based, 5 g of pectin based, 5 g acrylic based and three orange peel-based variables were placed in six separate vessels. To each vessel 200 ml of distilled water was added and allowed to rest for 10 minutes. The water retention ability of the six polymers were calculated using the formula $$\frac{(gs - gi)}{gi}$$

Where gs: is the weight of the swollen sample and gi: is the initial weight or net weight of the sample.

It was observed that orange peel-based polymers displayed the strongest water retaining abilities of 76.1%, the acrylic SAP displayed a water absorbing ability of 74.7% and pectin and starch had ability below 70%.

In another embodiment of the present invention, seven planting containers were filled with 1 kg topsoil and to each container different sample to be tested was added. Samples added were 25 g starch SAP, 25 g pectin SAP, 25 g acrylic SAP and these three samples were considered as positive control for the experiment. 25 g orange peel powder, 25 g orange peel solution and 25 g orange peel mixture served as experimental group and container without any sample served as control. Each of the sample added were mixed well with the soil and were saturated with 100 ml water on day 0. For next 21 days no additional water was added to the containers. Soil moisture was then measured every day during specific time of each day for 21 days using soil moisture meter.

It was observed that containers after 10 days with orange peel variables, acrylic SAP, starch SAP and pectin SAP had significantly greater soil moisture levels compared to the control with no sample. After twenty-one days, the soil moisture in the pots containing the 'Orange peel powder',

| S. no. | Day | Average Height (cm) | | | | |
|---|---|---|---|---|---|---|
| | | Grade-A | Grade-B | Other SAP | Mulching | No sample |
| 1 | 33 | 35 | 35 | 35 | 35 | 35 |
| 2 | 45 | 74 | 70 | 65 | 64.5 | 60 |
| 3 | 55 | 98 | 93 | 77 | 75 | 70 |
| 4 | 70 | 155 | 148 | 110 | 108 | 105 |
| 5 | 85 | 180 | 178 | 131.5 | 130.5 | 120 |
| 6 | 100 | 206 | 197 | 144.5 | 140 | 130.5 |

The experiment was conducted with 8 maize plants and the plants were irrigated only twice. It was observed that the maximum growth of plants was in the set given Grade A followed by others as shown below:

Grade-A>Grade-B>Other SAP>Mulching>Normal Case
The water retention power observed was:
Other SAP>Grade-A>Grade-B>Mulching>Normal case
Stem Diameter was:
Stem dia.: Grade-A>Grade-B>Other SAP>Mulching>Normal Case
Average Number of leaves per plant was the highest in the case of Grade-A:
Grade-A>Grade-B>Other SAP>Mulching>Normal Case
In yet another experiment, the effect of water absorbency with polysaccharides and crosslinker in various ratios were observed. The Table 1 shows the results obtained.

| S. No | Nomenclature | Pectin (g) | Linseed gum (g) | SA 1 % (g) | SA3 % (g) | SA6 % (g) | SA9 % (g) | Water Absorption (ml/g) |
|---|---|---|---|---|---|---|---|---|
| 1 | PLSA100/0/0 | 1 | 0 | 0 | 0 | 0 | 0 | 7.2 |
| 2 | PLSA0/100/0 | 0 | 1 | 0 | 0 | 0 | 0 | 18 |
| 3 | PLSA90/10/1 | 0.9 | 0.1 | 0.01 | 0 | 0 | 0 | 21 |
| 4 | PLSA90/10/3 | 0.9 | 0.1 | 0 | 0.03 | 0 | 0 | 43 |
| 5 | PLSA90/10/6 | 0.9 | 0.1 | 0 | 0 | 0.06 | 0 | 30 |
| 6 | PLSA90/10/9 | 0.9 | 0.1 | 0 | 0 | 0 | 0.09 | 27 |
| 7 | PLSA75/25/3 | 0.75 | 0.25 | 0 | 0.03 | 0 | 0 | 86 |
| 8 | PLSA25/75/3 | 0.25 | 0.75 | 0 | 0.03 | 0 | 0 | 59 |
| 9 | PLSA50/50/3 | 0.50 | 0.50 | 0 | 0.03 | 0 | 0 | 63 |
| 10 | PLSA50/50/6 | 0.50 | 0.50 | 0 | 0 | 0.06 | 0 | 57 |
| 11 | PLSA58/42/6 | 0.58 | 0.42 | 0 | 0 | 0.06 | 0 | 89 |
| 12 | PLSA75/25/6 | 0.75 | 0.25 | 0 | 0 | 0.06 | 0 | 85 |

'Orange peel mixture', starch SAP and acrylic SAP remained at moisture levels of 3.8 to 4.8. These moisture levels are plant growth friendly.

In another experiment, the growth of plant was determined. It was observed that the number of flowers was significantly more in the plants given orange peel mixture and acrylic SAP compared to the plant in the container given no sample. Also, the plants were healthier and stronger in the containers containing orange peel mixture as compared to plants in the container containing acrylic SAP. Further, it was also observed that the plants in the container with no sample started to die after day 10 while in other containers containing acrylic SAP and orange peel mixture plants continue to grow healthily until day 16 and started to die only after day 20.

In yet another experiment, the testing of the polymer was done with maize plants in the field. For the experiment, an area of 100 sq ft was chosen and the seeds used were Pratap Pakka-5. The soil type was sandy soil and the measurements and observations were done for 100 days. The observations of the experiment are tabulated below and represented in bar graph shown as FIG. 1:

It will be apparent to those skilled in the art that various modifications and variations can be made in the products and methods of the present invention without departing from the spirit or scope of the invention. Thus, it is intended that the present invention cover the modifications and variations of this invention provided they come within the scope of the appended claims and their equivalents. Additionally, the foregoing examples are appended for the purpose of illustrating the claimed invention only and should not be construed so as to limit the scope of the claimed ion.

I claim:
1. A water retention natural polymer comprising
(a) a polysaccharide extracted from a bio-waste material, which is classified into (a1) pectin and (a2) a polysaccharide except pectin;
(a1) wherein the pectin comprises a galacturonic acid content above 75%, a methoxy content from 9 to 15%, and a degree of esterification not over 50%; and
(a2) wherein the polysaccharide except pectin comprises one or more selected from the group consisting of linseed gum, xanthan gum, guar gum, tragacanth gum, andacacia gum; and
(b) a crosslinker for crosslinking the pectin and the polysaccharide except pectin;

wherein the crosslinker includes sulfosuccinic acid that is non-carcinogenic, non-toxic and biodegradable, and a content of the sulfosuccinic acid is 3-6% by total weight of the polymer; and wherein the polymer holds water for 15 to 21 days and a water absorbing capacity of the polymer reduces an amount of water required for plant growth by 60-80%.

2. The water retention polymer as claimed in claim 1, wherein the bio-waste comprises one or more selected from the group consisting of fruit-waste, vegetable waste, fig barks and oil cake residue; and wherein the fruit-waste comprises one or more selected from the group consisting of citrus fruit peels, lemon peels, banana peels and jackfruit peels; and wherein the pectin is obtained from fruit-waste and the degree of esterification is from 20 to 25% against the weight of the pectin.

3. The water retention polymer as claimed in claim 1, wherein the polymer lessens a requirement of fertilizers by 40-60% for the growth of plants.

4. The water retention polymer as claimed in claim 1, wherein the polymer has a water retention property of supplying 20 to 40% of a water amount required for plant growth.

5. The water retention polymer as claimed in claim 1, wherein the polymer increases plant growth by 100-300%.

6. The water retention polymer as claimed in claim 1, wherein the polymer is reusable up to six months.

7. A method for producing the water retention natural polymer of claim 1, comprising:

extracting pectin from bio-waste;

dissolving the pectin in a 3% to 8% NaOH solution and a 3% to 10% urea solution for 10-45 minutes by stirring at 100 rpm-500 rpm to obtain a pectin solution;

adding the polysaccharide except pectin to the pectin solution in a ratio of 1:3-3:1 weight per weight of pectin dissolved, by stirring for 25-35 minutes to form a mixture thereof;

adding a crosslinker to the mixture at 1-10% of a total weight of the polysaccharide except pectin;

incubating the mixture at about 55° C. to about 90° C. for about 5 hours to about 6 hours;

cooling and drying the mixture at about 60° C. to about 80° C. for about 15 hours to about 24 hours;

and grinding the mixture to obtain the polymer with a mesh size of about 60 to about 150.

8. A plant growth stimulant comprising the water retention polymer as claimed in claim 1 as an active ingredient to increase plant growth by 100-300%.

* * * * *